Dec. 25, 1956  D. WESTON  2,775,347
METHOD AND APPARATUS FOR SCREENING MATERIALS
Filed July 28, 1953  3 Sheets-Sheet 1
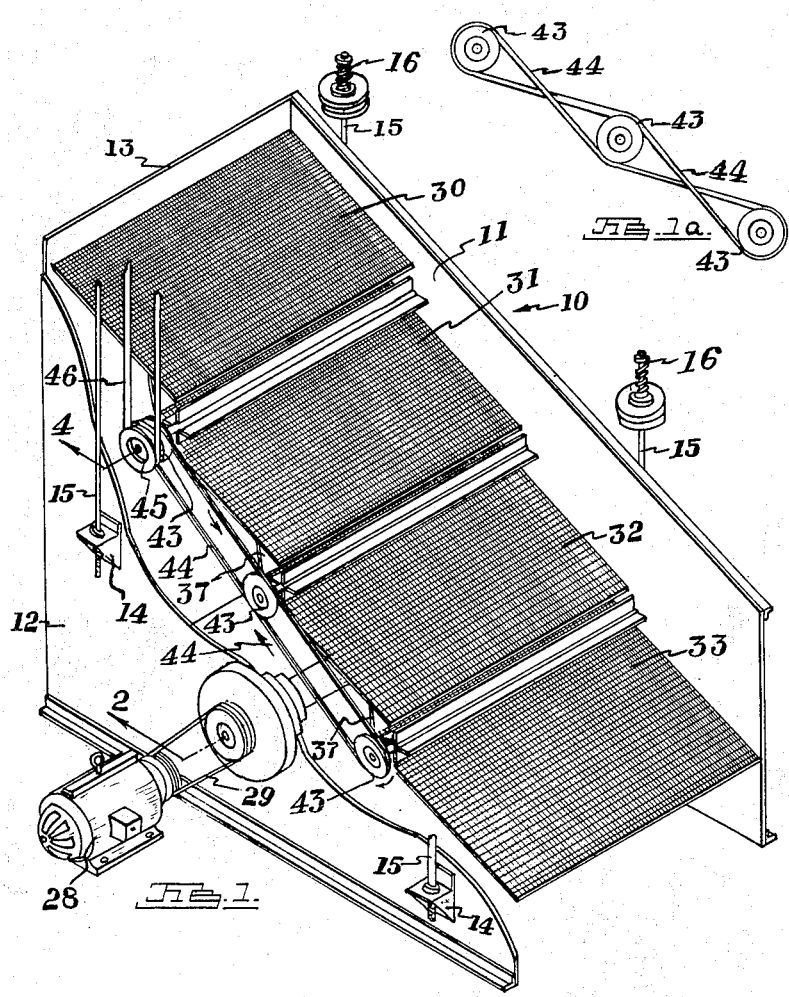
INVENTOR
DAVID WESTON
By Fetherstonhaugh & Co.
ATTORNEYS Dec. 25, 1956 D. WESTON 2,775,347
METHOD AND APPARATUS FOR SCREENING MATERIALS
Filed July 28, 1953 3 Sheets-Sheet 2

INVENTOR.
DAVID WESTON
By Fetherstonhaugh & co
ATTORNEYS

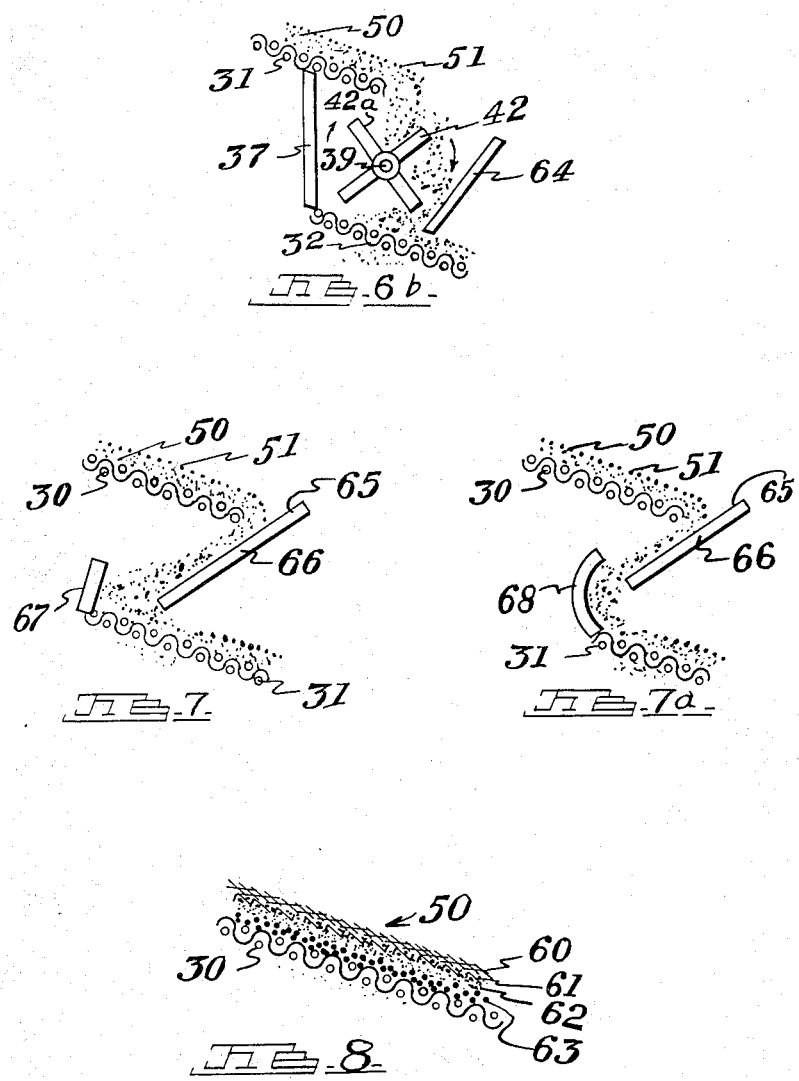

2,775,347

METHOD AND APPARATUS FOR SCREENING MATERIALS

David Weston, Toronto, Ontario, Canada

Application July 28, 1953, Serial No. 370,785

5 Claims. (Cl. 209—314)

This invention relates to a method and apparatus for the screening of materials. More particularly, it relates to a method and apparatus which is suitable for the screening of a mixture of opened asbestos fibres, crude mixtures of the same with unopened fibre bundles, small rock particles, dust and the like.

It is well known to separate asbestos fibres from such mixtures with the aid of vibrating and rotary type reciprocating screens but due to the peculiar behaviour of fibrous materials when passed over such screens, such separation has been attended with considerable difficulty and the degree of separation attainable has been comparatively small for each screening operation, necessitating the use of a large number of individual screening steps in the production of acceptable products. The basic difficulty arises from the fact that granular material on a reciprocating screen tends to stratify and fibrous materials tend to mat. When crude asbestos mixed with unopened fibre bundles, rock particles and dust is placed on a reciprocating screen, the open asbestos fibre will form a mat on the top of the material while the remaining material will stratify the coarsest granular material forming the lowest strata and tending to supoprt the fine granular material preventing it from passing through the interstices of the screen. At the same time, dust and very fine granular material becomes held within the fibre mat both mechanically and by reason of electrostatic attraction between the fibres and individual particles of dust.

It is generally recognized that at least a portion of the dust and fine granular particles may be dislodged from the matted fibres by throwing the fibres against a solid surface or an impact blow and that the particles held on the top of the mat could be removed by screening provided some means could be found for applying a screen in a manner to take advantage of their position at the top of or within the mat. However, despite the existence of the problem for many years and the recognition by those in the art of the factors upon which a solution might be based, no apparatus has as yet been devised which is capable of bringing about a significant reduction in the number of screening operations which are required in the production of finished asbestos fibre from crude stock which contains unopened fibre bundles, small rock particles and dust.

I have found now that whereas it may be cumbersome or impractical to remove the material which is held within the asbestos mat on the screen by screening it in an upward direction, it is entirely practical to invert the mat as it comes off the end of one screen and deposit it upside down on a subsequent screen and thus remove the material in a downward direction. In general, this is accomplished according to the invention by the use of baffle means which preferably take the form of rotary baffles comprising a plurality of radially disposed baffles arranged below the discharge end of one sloping screen and above the end of a successive screen of a similar character. When the rotating baffle means are rotated in a direction causing the individual baffles to sweep outwardly away from the lower end of the upper screen, the mat which is discharged from the end of the screen will fall on to a baffle with its upper side against the baffle surface. While the outer edge of the baffle is at a higher elevation than the axis of rotation of the baffle means, the thus deposited mat will tend to slide down the baffle towards the axis of rotation. However, as the rotation continues, the outer edge of the baffle is lowered and the deposited material will slide down the baffle on to the lower screen where it is deposited with the material which was uppermost on the upper screen lowermost on the lower screen. In this manner, the loose particles which have been held in the mat at the top of the material on the upper screen are enabled to pass downwardly through the lower screen and the separation process is greatly accelerated.

Having regard to the foregoing, the apparatus of the invention consists broadly of a plurality of sloping screens arranged in series with each successive screen being arranged below the next highest in the series to provide a space between the lower end region of the next higher screen and the upper end region of the successive screen. Suitable means are provided for reciprocating the screens. Between successive screens in the apparatus are provided baffle means arranged to control the path of material passing from the upper screen to the lower screen in such a way as to destroy the stratification which has taken place on the upper screen. These baffle means may be in the form of rotatable baffles which may be used either to invert the material leaving the upper screen so that it is delivered to the lower screen with the mat of fibres lowermost or alternatively these rotating baffles may be used to throw the material against the fixed baffle in order to loosen and dislodge fine material which is mechanically or electrostatically held by the open fibres.

In order to invert the mat which has been built up on the first screen, the rotating baffle means should rotate in a direction which causes the baffles to sweep outwardly away from the lower end of the first screen. If the rotating baffle means is used for the purpose of throwing the material against a fixed baffle, it may be rotated in the opposite direction or in the same direction somewhat more rapidly. In the latter case, the fixed baffle will be positioned beyond the end of the upper screen whereas in the former case the fixed baffle will extend from the lower side of the upper screen to the upper end of the lower screen so that the baffle means is partly enclosed.

In any given series of screens in an apparatus according to the invention, it may be desired to have some of the baffle means rotate in one direction and some in the other direction so that a complete screening action on granular material, unopened fibre bundles, opened fibre, and dust may be effected. It may be found convenient, for instance, to have the baffle means between the first and second screens of the series arranged so as to invert the mat discharged from the first screen. This will result in a major portion of the loose granular material, dust, and etc. being removed by the time the material arrives at the lower end of the second screen. Then, if the baffle means between the second and third screens is arranged to rotate in the opposite direction, the dust, granular material, and etc. bound within the fibre mat will be dislodged and a good portion of it will be removed on the third screen. Some of the thus dislodged material may tend to stratify with the mat on the third screen, and accordingly, by inverting the mat between the third and fourth screens, this stratified material can be removed and so on, the particular arrangement of the direction of rotation of successive baffle means being a matter which can easily be modified to suit particular conditions of operation.

From the above, it will be apparent that the invention contemplates power means to drive the rotatable baffle means in the case where the baffle means is intended to throw the material from the upper screen against a fixed baffle. It will be appreciated, however, that where the function of the baffle means is to invert the mat during its passage from one screen to another the baffle means may be freely rotatable so that the weight of the material deposited on the baffles will cause rotation. Alternatively, the baffles may be provided with a power drive in this case also.

Inasmuch as the raw material may be conveyed to the apparatus entrained in an airstream, it may be convenient to enclose the space both above and below the screens in a housing and to withdraw the air from a point beneath the screens. In this case, it will be convenient to convey the material which passes through the screens away from the apparatus in the withdrawn airstream.

The invention and its operation will be more particularly described in conjunction with the accompanying drawings which illustrate one embodiment of an apparatus according to the invention.

In the drawings,

Figure 1 is a perspective view of the apparatus according to the invention partly broken away to illustrate detail and showing the general arrangement of parts.

Figure 1a is a detail of an alternative drive for the apparatus shown in Figure 1.

Figure 2 is a cross section of the apparatus illustrating in section the vibrating mechanism, the section being taken on the line 2—2 in Figure 1.

Figure 6b illustrates an alternative embodiment wherein the rotating baffle means throws material against a fixed baffle positioned outwardly of the end of the upper screen.

Figure 7 illustrates an embodiment of the invention wherein fixed baffles are used to control the flow of material from the upper to the lower screen.

Figure 7a illustrates an alternative arrangement of the baffles, and

Figure 8 is an enlarged section taken through a screen and the material on it illustrating the type of stratification which generally occurs during the screening of crude asbestos.

Figure 3:
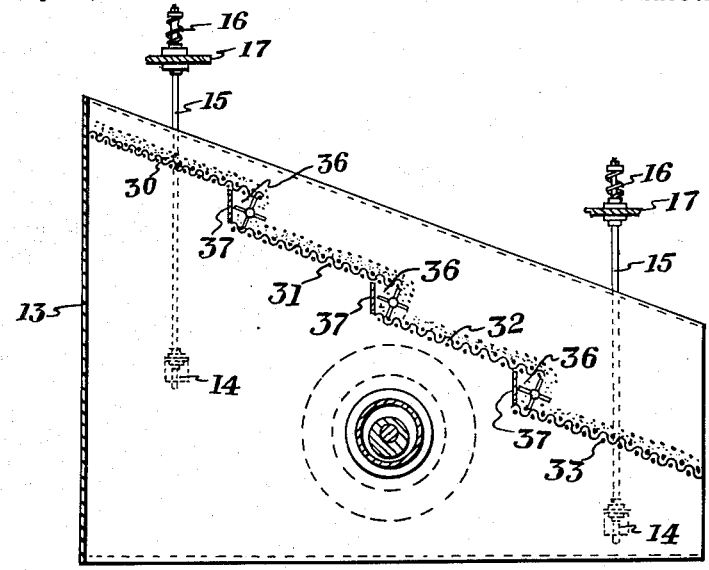
Figure 3 is a vertical longitudinal section of the apparatus taken along the plane 3—3 in Figure 1.

Referring now more particularly to the drawings, the apparatus of the invention is mounted in a housing illustrated generally at 10 and consisting of the side walls 11 and 12 and the end wall 13 which are preferably fabricated from welded sheet metal. The housing 10 is provided with four brackets 14 and the whole apparatus is supported on the four rods 15 which are in turn supported on the compression springs 16 which bear upon suitable fixed structural elements 17. The whole apparatus, therefore, is freely suspended from four spring mountings.

In a central position and secured to each side wall 11 and 12 are the heavy bushings 18 and 19 which are provided with the bearings 20 and 21 respectively, which bearings provide mounting for the vibrator shaft 22 which carries the centrally positioned eccentric weight 23. The inner extremities of the bushings 18 and 19 are adapted to mount tubular member 24 which serves as a dust cover for the vibrator shaft and eccentric weight 23. Mounted on the shaft 22 outside the housing 10 at either end of the shaft are fly wheels 25 and 26 and the shaft 22 is further provided with the sheave 27 by means of which the shaft may be rotated by the motor 28 and belt drive 29. When the shaft 22 is rotated, the eccentric weight 23 sets up a vibrating motion causing the whole apparatus to vibrate. The means above described for causing vibration of the apparatus are, of course, in themselves well known, and it will be appreciated that any other known means for accomplishing the same purpose could be substituted therefor in the present apparatus. In particular, depending upon the reciprocating action desired, the screens may be reciprocated with a circular motion in their major plane, as is common in the asbestos art, or they may be vibrated in various planes by means of electrical vibrators.

Figure 4:
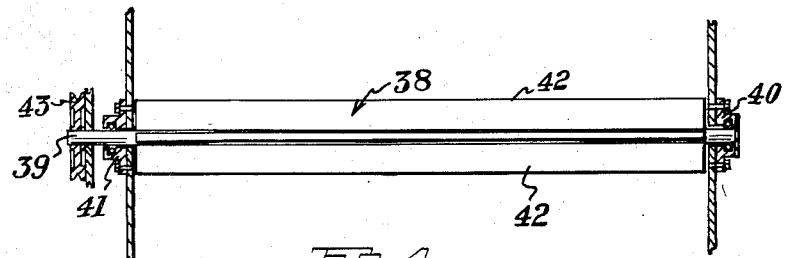
Figure 4 is an enlarged view of one of the baffle means illustrating the mounting thereof.

Secured within the housing 10 and extending from side to side thereof are the screens 30, 31, 32 and 33. As will be best observed from Figure 3, these screens slope downwardly and are disposed in series, each successive screen being arranged below the next higher in the series to provide a space 36 between the lower end region of the higher screen and the upper end region of the successive screen. The forward end of each space 36 is closed off by a fixed baffle 37 extending from the bottom side of the upper screen to the upper end of the lower screen. Mounted between each pair of screens substantially within the spaces 36 are the rotating baffle means 38 (see Figure 4). These rotating baffle means comprise generally the shaft 39 mounted upon bearings 40 and 41 in the side walls 11 and 12 of the housing 10. Each shaft 39 is provided with four radially disposed uniformly spaced baffles 42. The bearings 40 are journal bearings, but the shaft 39 extends through the bearings 41 and is provided at its end with the sheave 43, which may be connected to a belt drive 44 (see Figure 1). As shown in Figure 1, the shaft of the baffle means between the screens 30 and 31 is provided with an additional sheave 45 which is driven by the belt drive 46 by suitable power means (not shown). While the baffle means 38 have been illustrated as comprising four radial baffles, it will be appreciated that the apparatus would operate just as effectively with a smaller or larger number of radial baffles. Further, although in Figure 1 all of the baffle means 38 are illustrated as being power driven, it is contemplated that in certain cases the baffle means will be rotated by the weight of the material deposited on the blades. In this case, the sheaves 43 will not be present. Further, it may be desired to rotate one or more of the baffle means in the direction which will cause the baffles to throw the material deposited on them against the baffles 37. This can conveniently be done in the apparatus illustrated in Figure 1, for instance, by reversing the belt drive as it passes over the sheave 43 of the baffle means between the screens 31 and 32 so that its associated baffle means will rotate in a direction opposite to the baffle means between the screens 30 and 31 and the screens 32 and 33 (as shown in Figure 1a). Alternatively, the same object would be accomplished by attaching the sheave 45 and the power drive 46 to the shaft of the baffle means between the screens 31 and 32 eliminating the belt 44 and permitting the remaining two baffle means to rotate freely by the action of material deposited upon the baffles.

In cases where a particular baffle means 38 is intended to rotate so as to throw material against its associated baffle 37, it will be desirable to position the shaft 39 slightly beyond the end of the upper screen 31a (see Figure 5) so that the rotating baffles will not tend to throw material back on the screen 31a. On the other hand, if the baffles are intended to rotate in the other direction so as to invert the mat from the upper screen before depositing it upon the lower screen the shaft 39 should be located underneath the end of the screen 31b (see Figure 6).

The operation of the apparatus illustrated in the drawings is as follows:

Material to be treated is deposited at the upper end of screen 30 either from a belt conveyor (not shown) or from an airstream in which the material is entrained (also not shown). Alternatively, the feed might be fed from a storage bin, the particular method of feeding being dependent upon the circuit which is in use at the particular plant. The shaking action produced by the shaft 22 and its eccentric weight 23 causes the material to spread out over the screen 30 and form a mat 50 of asbestos fibre which continually moves down the screen and falls off the lower end thereof. As the mat moves down the screen, loose material such as dust, unopened fibre bundles and fine granular material, situated in the lower regions of the mat and not mechanically or electrostatically bound therein will pass through the interstices of the screen 30 and be removed. At the same time, the material remaining on the screen will stratify substantially in the manner illustrated in Figure 8 with a mat 60 of opened asbestos fibre on the surface, which mat will contain a certain amount of mechanically or electrostatically held fine granular material and dust, a layer 61 consisting principally of unopened fibre bundles immediately beneath the mat 60, a layer 62 of fine granular materials immediately beneath the layer 61 supported on a layer 63 on relatively coarse granular material which is supported on the screen 30. As the material falls off the lower end of the screen 30, it will strike the surface of a baffle 42 in the manner illustrated in Figure 6 with the top of the mat 50 and the layer of granular material etc. 51 against the baffle. The end of the mat 51 will move down the baffle 42 towards the shaft 39 until the baffle passes the horizontal position at which time the succeeding baffle 42a will cut the mat as it sweeps past the lower end of the screen 30 permitting it to fall flat against the baffle 42. When the baffle 42 has proceeded around to the point where it is in the same position as the baffle 42b in Figure 6, the mat will commence to slide off the baffle and on to the screen 32, dust and granular material from the layer 51 striking the screen first in the area 52 and passing therethrough to be removed while further loose material within the mat will be removed as the material progresses down the screen 32.

Figures 5, 6, 6A:
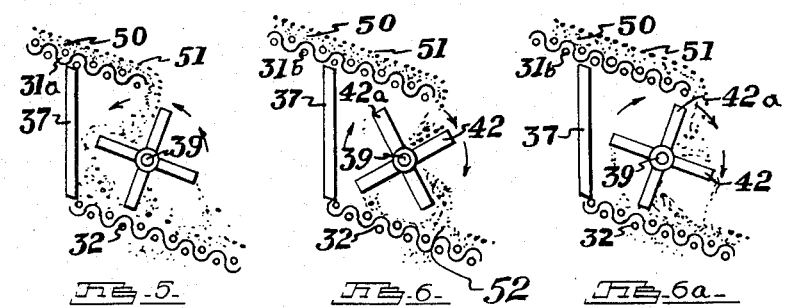
Figure 5 is an enlarged detail view of the adjacent ends of two screens and the baffle means illustrating one manner of operation of the apparatus of the invention.
Figure 6 is an enlarged detail view similar to that shown in Figure 5 but illustrating a further method of operation according to the invention.
Figure 6a shows the structure illustrated in Figure 6 in a different position during operation.

When the material has passed over a sufficient number of screens and has been inverted between each successive screen in the manner described above, a stage will be reached when all of the loose material will have been removed from the fibre mat, and it will then be desirable to loosen the material which is held within the mat by subjecting it between successive screens to the action of a baffle means rotating in the opposite direction so as to throw the material forcibly against a baffle 37 in the manner illustrated in Figure 5, or a more rapidly rotating baffle rotating in the same direction which throws the material forcibly against a baffle 64 as illustrated in Figure 6b.

As illustrated in Figure 1a, it may be found convenient to invert the fibre mat between the first and second screens, loosen the bound material between the second and third screens, and invert the mat again between the third and fourth screens.

In place of a rotating baffle, use may be made of fixed baffles such as those illustrated in Figures 7 and 7a. In this case, the material will be deposited against the sloping face 65 of the baffle 66 with the top layer 51 generally next the surface 65. The slope of the baffle 65 must, of course, be greater than the angle of repose of the material being treated. The material may then be deposited directly on the lower screen 31 as illustrated in Figure 7 where the small baffle 67 acts merely to prevent material from overflowing the upper end of the lower screen 31. Alternatively, a second fixed baffle such as the curved baffle 68 illustrated in Figure 7a may be used to direct material delivered by the baffle 66 on to the lower screen 31. In either case, the stratification will be destroyed on passage between the screens, and a more effective screening action can be effected by the lower screen 31. What use is made of rotating baffles and fixed baffles in any particular apparatus will, of course, be determined by the character of the material which is being treated, and in this connection, it must be remembered that whereas the present invention has been described having particular regard to the screening of asbestos, it can be used to advantage in many other applications where the nature of the materials being treated give rise to stratification problems.

Depending upon the actual operating conditions and the type of material being treated, it may be found desirable to increase the number of screens in the apparatus, or to vary the mesh size of the screens. It will be apparent, therefore, that the apparatus is easily adaptable to meet conditions of operation, and in view of the above description, those skilled in the art will have no difficulty in modifying the apparatus to meet the particular conditions and the particular material in any given case.

What I claim as my invention is:

1. Apparatus for screening materials comprising; a plurality of sloping screens arranged in series, each successive screen being arranged below the next higher in the series to provide a space between a lower end region of the next higher screen and an upper end region of the successive screen; means for imparting reciprocating movement to said screens; a fixed transverse baffle extending between the lower side of the next higher screen and the upper end of the successive screen, defining said space on its forward side; and rotatable baffle means mounted for rotation about a substantially horizontal axis, disposed below the lower end of the next higher screen and extending transversely from side to side of said space, said baffle means comprising a plurality of baffles disposed substantially radially of the axis of rotation thereof, said baffle means being so positioned that said baffles during rotation of said baffle means extend beyond the lower end of the next higher screen to intersect the path of travel of material discharged therefrom.

2. Apparatus as defined in claim 1 comprising power means to drive said baffle means.

3. Apparatus as defined in claim 1 wherein said baffle means is mounted freely for rotation by the influence of material deposited on the baffles from said next higher screen.

4. Apparatus as defined in claim 1 comprising power means arranged to drive said baffle means in a direction of rotation which is such that at the top of their sweep the radial baffles are moving toward said fixed baffle.

5. Apparatus defined in claim 1 wherein at least one of said baffle means is arranged to rotate in one direction and at least one of said baffle means is arranged to rotate in the opposite direction.

References Cited in the file of this patent

UNITED STATES PATENTS 454,065   Pye _____ June 16, 1891

FOREIGN PATENTS 3,383   Great Britain _____ Nov. 14, 1907